June 2, 1964
L. H. COPLEN ETAL
3,135,644
CONTINUOUS VENEER CORE, AND METHOD
AND APPARATUS FOR MAKING THE SAME
Filed Nov. 2, 1960
4 Sheets-Sheet 1
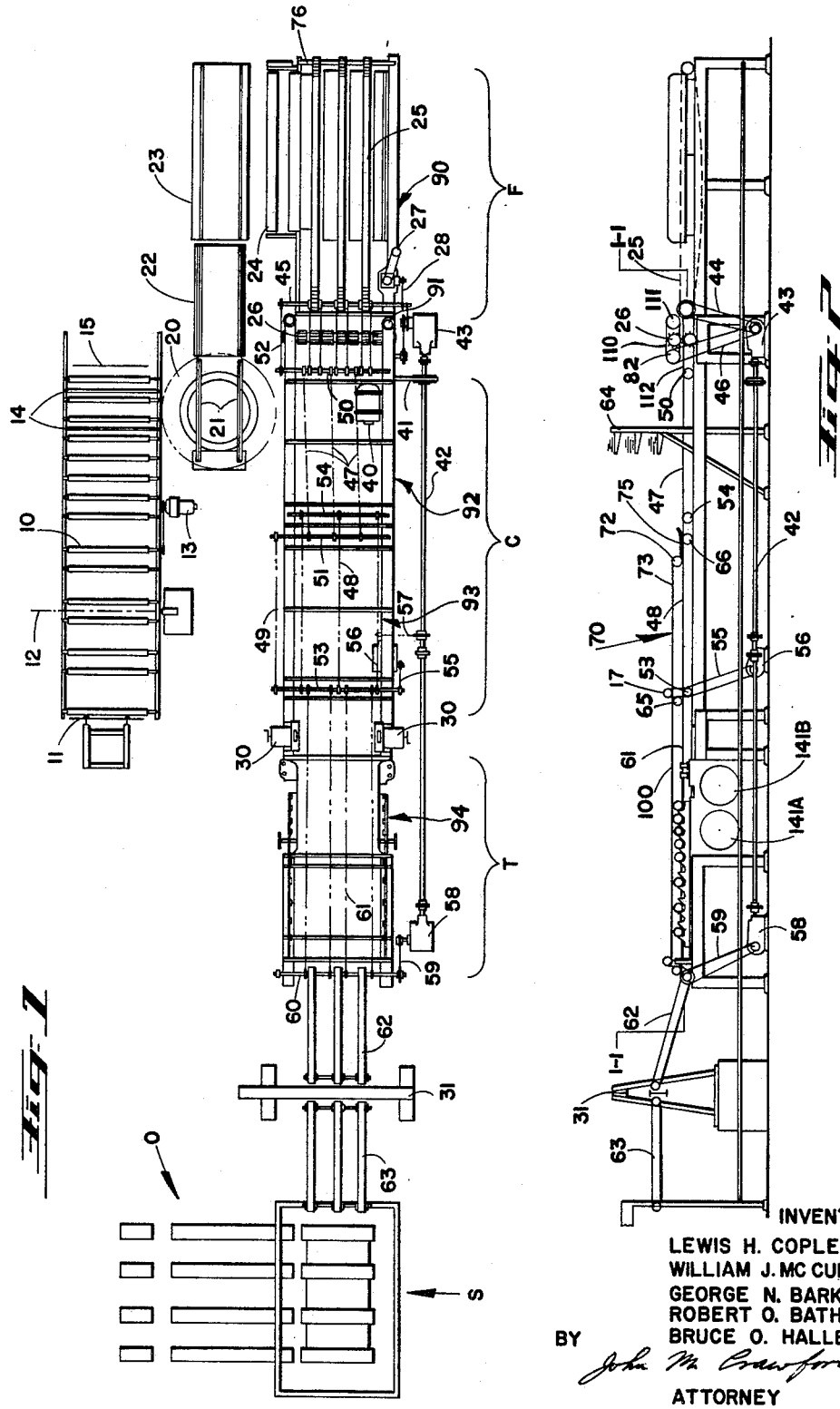
INVENTORS
LEWIS H. COPLEN
WILLIAM J. MC CUDDEN
GEORGE N. BARKER
ROBERT O. BATHIANY
BRUCE O. HALLBERG
BY John M. Crawford
ATTORNEY

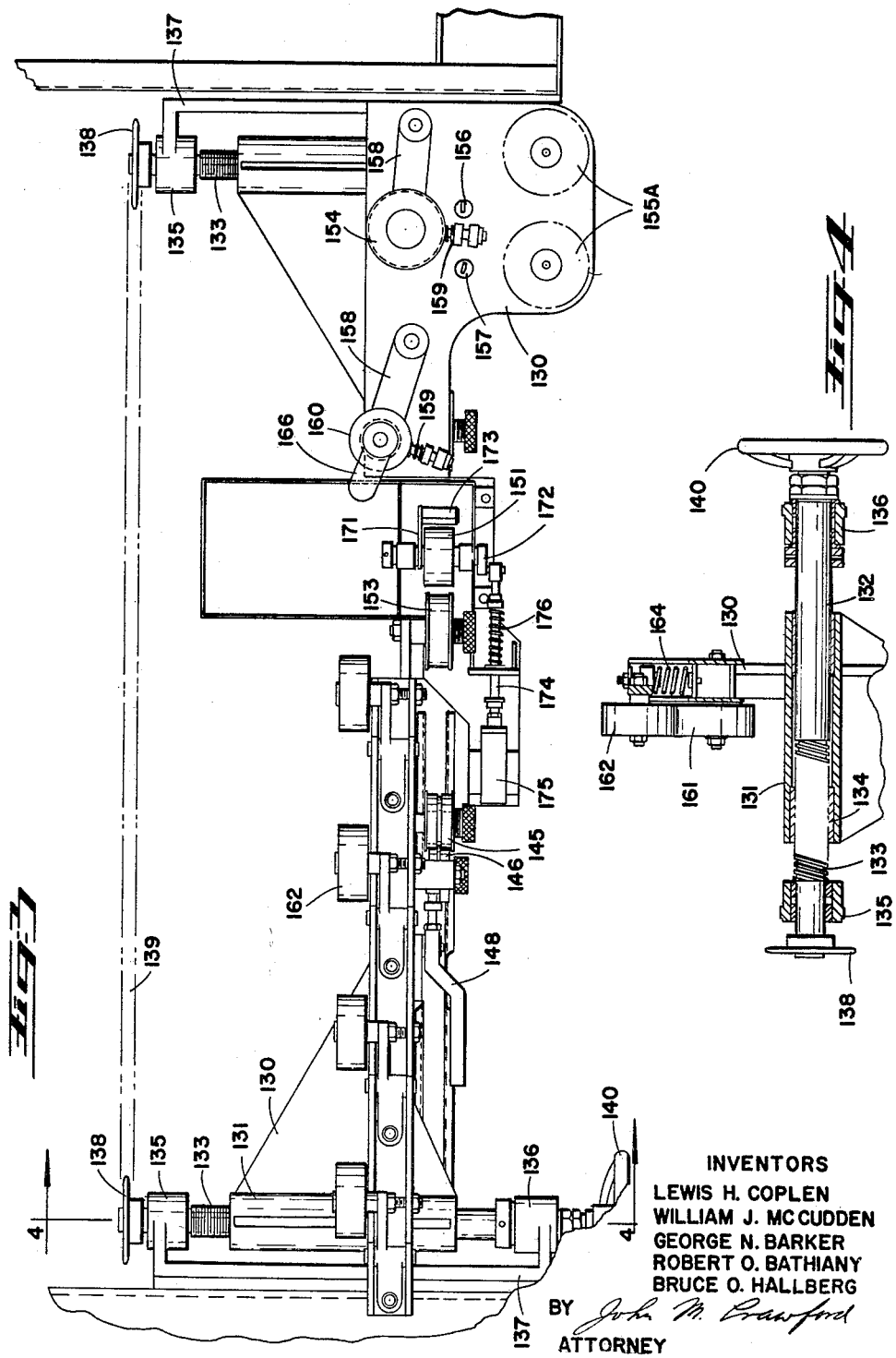

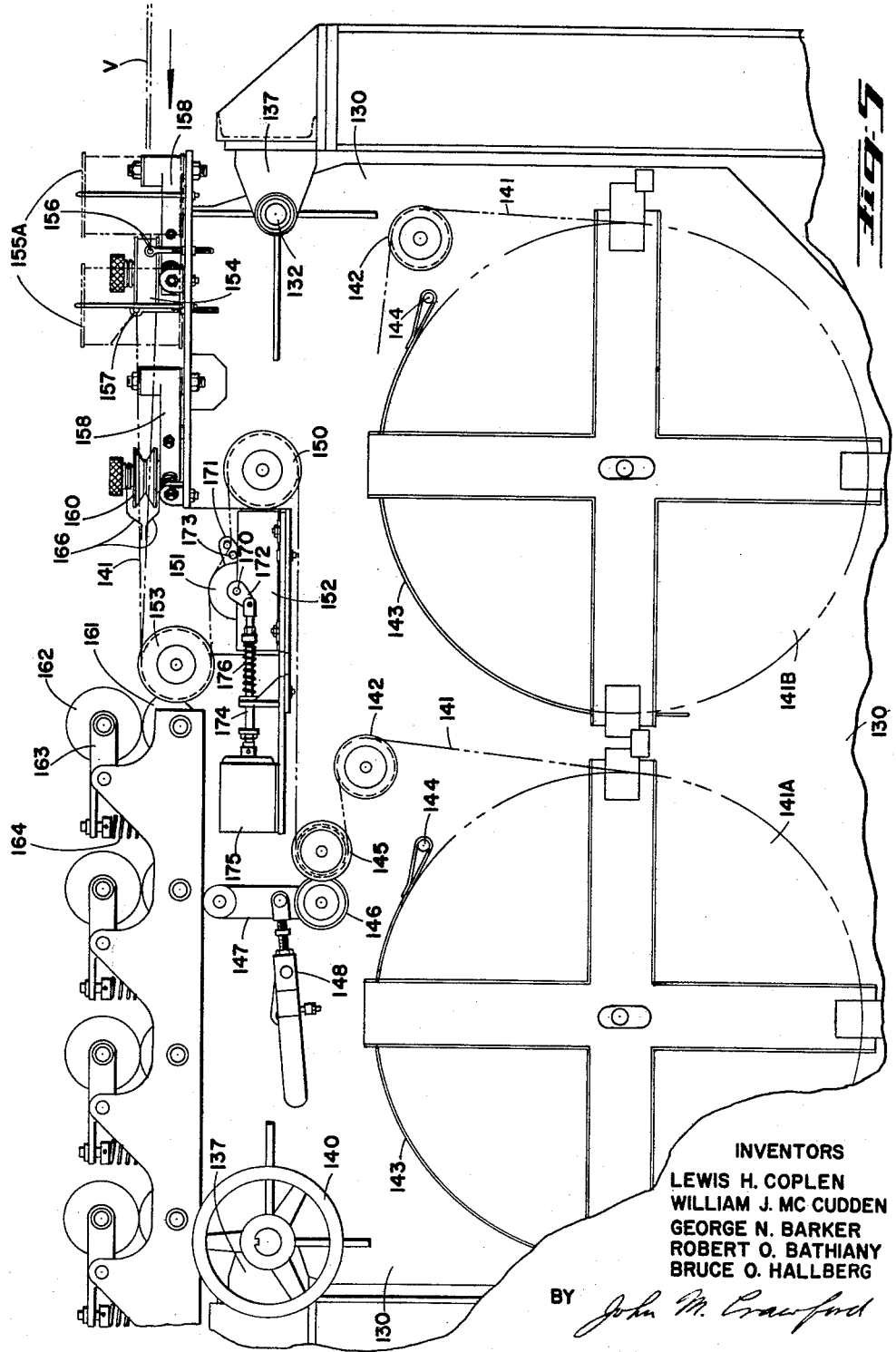

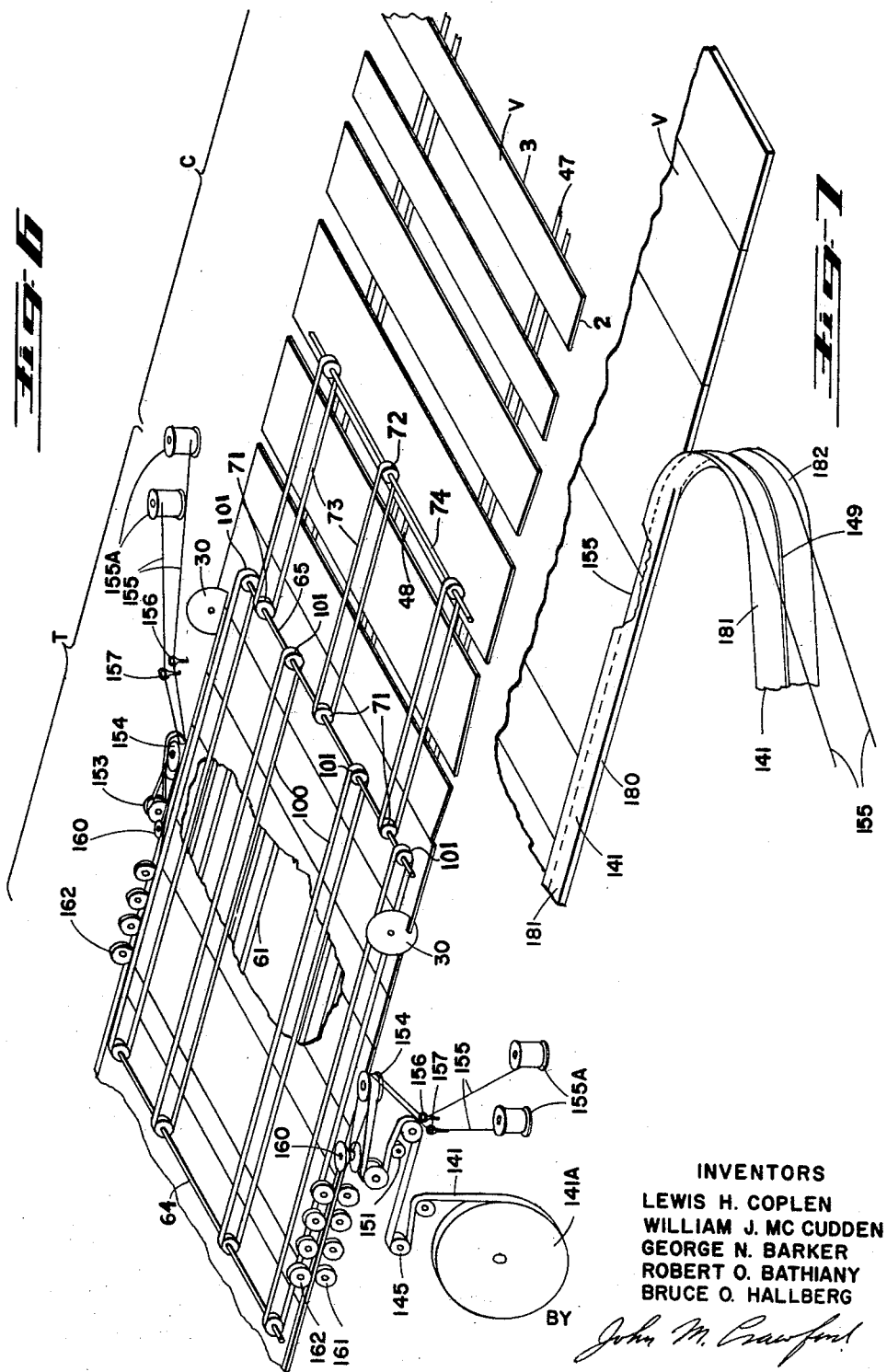

United States Patent Office 3,135,644
Patented June 2, 1964

3,135,644
CONTINUOUS VENEER CORE, AND METHOD AND APPARATUS FOR MAKING THE SAME
Lewis H. Coplen, Longview, Wash., William J. McCudden, Carmel, Calif., and George N. Barker, Robert O. Bathiany, and Bruce O. Hallberg, Longview, Wash., assignors to Weyerhaeuser Company, Tacoma, Wash., a corporation of Washington
Filed Nov. 2, 1960, Ser. No. 66,746
17 Claims. (Cl. 161—101)

This invention relates to the manufacture of an improved assembled veneer core for use in the manufacture of plywood.

A plywood panel is a sandwich of several layers of veneer which have been pressed together and adhesively united to form a type of board having properties for many purposes superior to any natural board which can be sawed from a log. These superior properties result largely from the cross-grained arrangement of the successive layers of wood veneer which are usually three, five or seven in number. The number of layers may vary and the individual veneers may vary in thickness from about 1/32" to 1/4", but a common characteristic of all plywood is that the grain does not run in the same direction in adjacent layers. Veneer which is unsuitable for the face or back sheets is utilized to form the interior plies. Plywood is made commercially in rectangular panels wherein the grain of the face and back sheets runs longitudinally of the panel. Between the face and back sheets there are always one or more intermediate cross-grained core layers wherein the grain runs transversely of the panels. The present invention is concerned with these cross-grained core layers.

Core veneer is usually of random width resulting from the clipping out of the more serious defects, many pieces of core veneer being quite narrow to avoid waste of any usable wood. Hence, a core layer ordinarily comprises a number of separate pieces of veneer disposed in an edge-to-edge relationship so that there will be no spaces or gaps in the interior of the panel. In assembling the cross-grained core layer of a plywood panel sandwich the core veneers are glue-coated on each side and placed on the back sheet layer of the sandwich by hand. In order to expedite the manual placement of the random width veneers so that the process will be as economical as possible, and insure the complete coverage of the back sheet, it is necessary to have some excess length in the veneers. For the same reasons, the last strip of veneer in each cross-grained core layer is always wider than necessary so that there is an overhang along one end of the sandwich as well as along both sides of the sandwich. This overhang, which is later trimmed off, represents not only a waste of veneer but also a waste of the expensive glue coating on the double-coated overhang veneer.

An additional problem is encountered when the sandwich is moved from the place at which it was assembled to the plywood press where it is subjected to heat and pressure and formed into a plywood sheet. The movement sometimes causes a shifting of the individual veneer pieces in the cross-grained core relative to each other so that there may be gaps between the individual pieces or overlapping of one piece by another piece. Such panels might then be downgraded or rejected, which entails not only a loss of core material and glue, but, also represents a considerable loss in the much higher grade and more expensive face and back veneer sheets.

In order to eliminate this waste, avoid gaps and overlaps, and expedite the assembly of the sandwich panel, various attempts have heretofore been made to assemble and join core layers into a sheet which corresponds more closely to the dimensions of the back sheet and which can be handled as a unit. Thus, one-piece core sheets have been made by fastening together the available random width narrow veneers in various ways. These ways have included gluing the adjacent edges of the individual veneer strips together, stapling the adjacent edges of the individual veneer strips together, placing adhesive coated tape or adhesive coated string across the faces of the veneers, stitching the pieces together with thread in a sewing machine and grooving the veneer strip ends and gluing strings in the grooves.

The latter expedient is obviously limited to relatively thick veneers whereas most commercial plywood veneer is far too thin to accommodate end grooving. The interposition of tape in the glue lines is objectionable because it weakens the panel since there is no glue bond between the adjacent wood surfaces over the areas occupied by the tape and moisture may enter the glue line through the tape. String and staples have not provided sufficient retention to hold the pieces together in a unit and satisfactory edge gluing has proved practically incapable of attainment since the production rate is too low for commercial production and the removal of wood at the edges to provide satisfactory edge surfaces for gluing is not economical because of the large quantity of wood that is wasted.

The general objects of the present invention are, therefore, to provide an improved connector for uniting and holding random width pieces of core veneer into a core sheet which may be handled as a unit, and to provide a novel and improved method and apparatus for applying the improved connector.

Another object is to provide an improved continuous veneer core sheet which may be cut to predetermined lengths without the waste entailed in laying up each core piece individually, and to provide an improved method and apparatus for making the core.

Another object is to provide a continuous veneer core sheet which will avoid gaps and overlaps in the panel, and to provide an improved method and apparatus for making the core.

Another object is to provide an improved taped continuous veneer core sheet in which the tape does not impair the glue bond in the panel, and to provide an improved method of taping the sheet.

Another object is to provide an improved taped continuous veneer core sheet in which the tape is applied to veneer ends which are trimmed off in the final sizing of the panel, and to provide an improved method of taping core veneers together.

Another object is to provide improved method and apparatus for rapidly securing and holding pieces of veneer together while the veneer is in continuous motion on a conveyor.

Another object is to provide connecting means of the type described which is operative on thin as well as thick veneer for forming core sheets of any desired thickness.

Another object is to provide an improved core sheet for plywood which is economical and produces an improved product.

The present invention involves the use of paper tapes applied in a new and improved way to the ends of the pieces of core veneer which are ultimately trimmed off whereby such tapes do not become incorporated in the finished panel. The tapes are applied continuously to the ends of the moving pieces of veneer with opposite side portions of the tapes being folded over and adhered to the opposite face surfaces of the veneer pieces. In this way the veneer pieces are connected together in a secure manner along their ends and the adjacent face portions regardless of the thickness of the veneer and without introducing serious problems in the prevention of gaps and overlaps. When additional strength is needed, threads may be laid under the side portions of the tape to reinforce the tape to the extent necessary. The application of the tape and threads may be carried out without difficulty at the highest continuous speed of movement at which the veneer pieces can be supplied and positioned by the operator assisted by a crowding mechanism to force all the pieces into true-edge-abutting relationship.

A conventional veneer incisor, such as a tenderizer or a distender, is employed to place incisions in the veneer. These incisions are longitudinal of the grain. They may be applied to one or both faces of the veneer, and may be continuous or discontinuous. These incisions reduce the tendency of the veneer to curl, thus facilitating the flattening of the veneer between chains or belts so that the abutting edges will meet without overlapping. The flattening also provides a uniformly level end for the application of the tape. The incisions may also stretch or distend the veneer by increasing the distance between adjacent grain structures. The incisor is adjustable to vary this distention at opposite sides of the conveyor and on the opposite ends of the veneer strips to aid in keeping the meeting edges of the veneer strips perpendicular to the line of travel.

Additional objects and advantages will become apparent and the invention will be understood more clearly from the following description of a preferred embodiment of apparatus for carrying out the method of the invention. It is to be understood, however, that various changes may be made in the construction and arrangement of parts of the machine and that certain features may be used without others, all such modifications within the scope of the appended claims being included in the invention.

In the drawings:

FIGURE 1 is a plan view taken along line 1—1 of FIGURE 2 showing the general arrangement of the apparatus for carrying out the method of the invention;

FIGURE 2 is a diagrammatic view of the side elevation of the apparatus shown in FIGURE 1;

FIGURE 3 is a fragmentary top plan view of the taping section;

FIGURE 4 is a view taken on the line 4—4 of FIGURE 3;

FIGURE 5 is a side elevation view of the taping section shown in FIGURE 3;

FIGURE 6 is a schematic perspective view illustrating the method of the invention; and FIGURE 7 is a fragmentary enlarged perspective view showing the method of applying the tape to the ends of the veneer strips to hold them together.

In the present invention, random width strips of veneer V, FIGURES 6 and 7, having ends 2 and edges 3, are united into a continuous veneer sheet which is suitable as a core material for plywood. The strips are united by adhesive coated tapes 141 which have a central portion 180 adhering to veneer ends 2 and side portions 181 and 182 adhering to the upper and lower faces of the veneer adjacent the ends. The sheet may additionally include reinforcing threads 155 placed between tape side portions 181 and 182 and their respective veneer faces. The sheet may then be cut into any desired lengths depending on the size of the plywood panel that is being manufactured. It should be noted that the width of the sheet, that is, the distance between ends 2 of the sheet, is greater than the width of the finished plywood panel so that the ends and the tape 141 may be trimmed from the finished plywood panel.

The machine for doing this, shown in FIGURE 1, comprises, in general, a plurality of sections which convey veneer in straight line movement from right to left. First, there is an infeed section F, then a crowding section C, then a taping section T, then a stacker S and, finally, an outfeed elevator O.

Also shown in FIGURE 1 are means for bringing stacks of veneers up to a convenient position alongside the infeed section F. Thus, a stack of veneers to be formed into a continuous core sheet is deposited on the roller conveyor 10 and moved to the left against a bumper 11. In the particular operation illustrated in the present drawings, the veneers are twice the length required for the core sheet whereby they must first be sawed in half. This is accomplished in the present instance by a chain saw 12 which cuts a stack of eight foot long veneers into two stacks of four foot veneers. The veneers may, however, be cut individually by a circular saw, if desired.

The rolls of roller conveyor 10 are power driven by an electric motor 13 so that the stack of four-foot veneers now resting on the right side of saw 12 may be moved to the right against a bumper 15. This places the stack over a short depressed transverse skate roller track 14 at one side of a turntable 20 equipped with a similar skate roller track 21. The remote end of roller track 14 is elevated to shift the stack by gravity onto the turntable track while the latter is turned in alignment with track 14. Then the turntable is rotated 90° to the position shown and the left end of track 21 is elevated to roll the stack by gravity onto the roller track of an inclined storage transfer station 22. By releasing a brake in station 22, the stack may be rolled onto the roller tracks of infeed elevator 23. This conveying process is repeated with the stack of veneers resting on the left side of saw 12, but the turntable 20 is rotated 90° in the direction opposite to that used for the previous stack. This opposite rotation compensates for any askew cuts caused by uneven piling of the veneer and for any lengthwise tapering of the original eight-foot pieces of core veneer.

Elevator 23 lifts the piles of veneer until the tops of the piles are in line with rolls 24. Workmen standing behind elevator 23 place the veneer strips endwise into power driven rolls 24 which deposit them transversely on the longitudinal conveyor belts 25 of infeed conveyor 90. The veneer strips thus deposited on belts 25 are of random width with the grain lengthwise of the strip whereby the direction of the grain is transverse to the direction of movement of belts 25. The veneer strips move constantly to the left and pass in edgewise movement past the end evener 27 and between a pair of corrugated rolls of an incisor 26 which incises the veneer strips longitudinally of the grain thereof, thereby limbering the veneer strips and reducing their tendency to curl so that they will lie substantially limp and flat as they enter the crowding section C. The incisor is adjustable to perform another important function of helping to even the veneer strips so that their edges remain perpendicular to the direction of travel as they pass through the crowder and taping section.

While passing through the crowder the veneer strips are crowded together in an edge abutting relationship and take on the appearance of a continuous sheet. The ends 2 of this sheet are then trimmed true and even by a pair of adjustable trim saws 30 which are located between the crowding and taping sections. In the taping section, the sheet of individual veneer strips is united into a long continuous ribbon of veneer, which is subsequently cut into core veneer sheets uniform in length by clipper 31. These core veneer sheets pass to a stacker S which forms stacks of predetermined height. The stacks are discharged to an outfeed elevator O for use in the manufacture of plywood panels.

The veneer strips are carried through sections F, C, and T by a series of conveyors. These conveyors are infeed conveyor 90, incisor conveyor 91, crowder infeed conveyor 92, crowder conveyor 93, and taping conveyor 94. Infeed conveyor 90 comprises a number of belts 25 trained around sprockets on idler shaft 76 and drive sprockets on drive shaft 45. Shaft 45 also has a set of idler sprockets for the lower section of incisor conveyor 91. Belts 112 of this lower section are trained around these sprockets and around drive sprockets on drive shaft 50. Shaft 50 also has a set of idler sprockets for belts 47 of crowder infeed conveyor 92. These belts are trained around the idler sprockets on shaft 50 and the drive sprockets on drive shaft 51.

Overlapping the drive shaft end of crowder infeed conveyor 92 are belts 48 of the lower section of crowder conveyor 93. These belts are trained around sprockets on idler shaft 54 and drive sprockets on drive shaft 53. Shaft 53 has idler sprockets which are used by belts 61 of the lower section of taping conveyor 94. Belts 61 are trained around these sprockets and around drive sprockets on drive shaft 60, and are supported by suitable guide tracks as are all of the supporting conveyor belts. The veneer strips are therefore continuously supported throughout the machine because of the overlap of the conveyors.

As has been indicated, three of the conveyors—incisor conveyor 91, crowder conveyor 93 and taping conveyor 94—have upper sections. The upper section of conveyor 91 prevents the veneer strips from curling around one of the incisor rolls. It consists of a number of belts 110 which are trained around drive sprockets on drive shaft 111 and idler sprockets on incisor drive shaft 82.

The upper sections of conveyors 93 and 94 have belts which slide across the upper faces of the veneer strips and hold the strips flat and prevent curling and buckling of the veneer strips during the crowding and taping operations. The upper section of crowder conveyor 93, mounted in upper frame 70, comprises a number of belts 73 trained around sprockets 72 on idler shaft 74 and drive sprockets 71 on drive shaft 65. Shaft 65 also mounts idler sprockets 101 for belts 100 of the upper section of the taping conveyor. Belts 100 are trained around these sprockets and around drive sprockets on drive shaft 64.

Belts 100 and 61 of the taping conveyor 94 move at a slower speed than belts 73 and 48 of the crowder, causing the veneer strips to be crowded together in an edge abutting relationship. The edges of the veneer strips may be maintained substantially perpendicular to the direction of travel by adjusting the pressure on belts 73 of the upper section of the crowder conveyor. The pressure may be varied from one side to the other in the same manner as incisor 26. The frame 70 of this section, which is pivotally mounted for quick access to the veneer, also carries a plurality of longitudinal runners 75 equipped with rollers to hold the veneer flat against the lower belts. Similar runners are used in the taping conveyor.

The number of conveyors permit a number of speed variations through the machine, although it is preferred to use but two speeds in the machine: one speed for conveyors 90, 91, 92 and 93, and a second slower speed for taping conveyor 94. All of these conveyors, and the incisor 26, may be driven from a common motor 40, as shown. It is preferred, however, to use a second motor for taping conveyor 94. Motor 40 drives a belt 41 on a longitudinal shaft 42 equipped with adjustable speed ratio take-off gear boxes for driving the incisor and different conveyors at appropriate speeds.

The incisor 26 and conveyors 90 and 91 are driven by chains 44 and 46 from gear box 43 which is located at one end of shaft 42. Chain 44 operates drive shaft 45 of conveyor 90. Shaft 45 in turn operates end evener 27 through drive chain 28, and drive shaft 50 through drive chain 52. Drive chain 46 operates drive shaft 82 which, in turn, drives incisor 26 and drive shaft.

Conveyors 92 and 93 are driven by chain 55 from gear box 56. This gear box is located centrally of shaft 42 and is driven by the shaft through chain 57. Chain 55 operates drive shaft 53 which in turn operates drive shaft 51 through chain 49, and drive shaft 65 through chain 17.

Conveyor 94 is driven by chain 59 from gear box 58. This gear box is located at the forward end of shaft 42 and may be driven by shaft 42 or by a separate motor. If a separate motor is used then shaft 42 terminates at gear box 56.

FIGURES 3 and 5 show the details of the tape dispenser assembly on the left side of the machine. There is a similar tape dispenser assembly on the right side of the machine. Each tape dispenser assembly is mounted on a movable frame 130 which is adjustable laterally in accordance with the adjustment of trim saws 30. Frame 130 is supported at each end by a transverse sleeve 131 which rides on a shaft 132 having a screw threaded portion 133. One end of sleeve 131 is equipped with a nut 134 engaging the threaded shaft portion 133. The ends of shaft 132 are supported in bearings 135 and 136 on arms of a bracket 137 mounted on the stationary machine frame. Both shafts 132 are equipped with sprocket wheels 138 which are interconnected by an endless chain 139, and one of the shafts is further equipped with a hand wheel 140 to rotate both shafts in unison. Thus, by turning the hand wheel 140, the frame 130 may be moved laterally in parallel motion toward or away from the center of the machine.

The lower portion of frame 130 supports a pair of rolls 141a and 141b of adhesive coated tape 141, and guide rollers 142 for the tape. Overrunning of the tape rolls is prevented by brake bands 143 which may comprise simply short lengths of belting anchored at one end to pins 144 on the frame 130 with the other ends resting loosely across the tops of the tape rolls. In FIGURE 5 the roll at 141a is in use and the roll at 141b is available for threading through the dispensing mechanism when roll 141a is exhausted.

Tape from the roll in use is trained around a roller 145 having a central circumferential groove into which the tape is pressed by a creasing roller 146. Creasing roller 146 is carried on the lower end of a pivotal arm 147 and has a central radial flange which is pressed into the groove in roller 145 against the adhesive side of the tape by a releasable toggle linkage 148. The flange on creasing roller 146 is of approximately the same thickness as the veneer.

After being creased down its middle at 149 (FIGURE 7) on roller 145, the tape is trained around another roller 150 and thence over a moistener roller 151 in a water pan 152. The tape then passes around a horizontal guide roller 153 and is turned on edge to pass around a vertical reversing roller 154 adjacent the trimmed end of the veneer. Additional moistening means may be provided at this point.

Moistener roller 151 rotates freely on a shaft 170 having a pair of crank arms 171 and 172 on its opposite ends. The tape runs between a pair of guide pins 173 and 171. Connected with the arm 172 is a solenoid plunger 174 which is pulled to the left by solenoid 175 when the veneer conveyors are running, depressing the guide pins 173 to hold the tape against the moistener roller. Whenever the veneer conveyors stop, solenoid 175 is de-energized allowing a spring 176 to rotate crank arms 171 and 172 counterclockwise lifting the tape off the moistener roller.

As the tape passes around roller 154 with its moistened adhesive side outward, it receives a pair of reinforcing threads 155 (FIGURES 6 and 7) from two spools of thread 155a. An eye 156 guides one of the threads to the lower side of the tape below the crease 149 and an eye 175 guides the other thread to the upper side of the tape above the crease, the threads being held in place on the tape by tension and the wet adhesive.

Thus reinforced, the tape reverses direction around roller 154 and is pulled to the left by the moving veneer in contiguous relation with the end thereof as it approaches a V-grooved folding roller 160. Rollers 154 and 160 are mounted on swinging arms 158 actuated by springs 159 to press the rollers against the edges of the veneer. Spring arms 166, mounted on roller 160, are biased inwardly toward the upper and lower faces of the veneer. The pre-formed crease 149 in the tape seeks the bottom of the groove in V-roller 160 to center the tape in this roller.

Roller 160, in conjunction with spring arms 166, doubles the tape over and folds it lengthwise along the crease 149 made by creasing roller 146 so that the top side 181 of the tape with one reinforcing thread 155 is folded over the top surface of the veneer while the lower side 182 with the second reinforcing thread is folded under the veneer. The tape with its reinforcing threads is then pressed firmly against the top and bottom surfaces of the veneer by a series of rollers.

The tape pressing rollers are arranged in pairs, each comprising a bottom roller 161 mounted on a stationary axis and a top roller 162 mounted on a spring arm 163 which is urged toward the bottom roller by a compression spring 164. The veneers are thereby securely taped together in edge-abutting relationship to form a continuous ribbon of core veneer. The reinforcing tape and threads are limited to end portions 2 of the ribbon of veneer which are ultimately trimmed off the plywood panel so that the tape applied in this manner does not impair the bond between the core veneer and adjacent layers of veneer in pressing the plywood sandwich.

All the taping mechanism just described is mounted on the adjustable side frames 130, one on each side of the veneer conveyor. The taping operation will be more clearly understood in the following description of the method with reference to FIGURES 6 and 7.

FIGURE 6 is a schematic diagram of the crowding and taping steps following the distending step. The incised and distended veneer strips are crowded together into edge-abutting relationship and held flat by confinement between the upper and lower belts as shown. When the veneer strips reach the taping section T the ends are trimmed by saws 30 and the tapes 141 are applied to the ends of the strips and folded over their upper and lower faces by V roller 160 and spring arms 166. When reinforcement is desired, the threads 155 are fed around the reversing roller 154 with one thread on opposite sides of the center crease 149. Since the adhesive on the tape is moistened by moistening roller 151, or other suitable moistening means, such as steam, the threads are retained in such position on the moving tape by the adhesive and travel with the tape. The threads 155 are omitted when such reinforcement is not needed.

Immediately after leaving V roller 160, the upper and lower sides of the tape are pressed firmly against the top and bottom surfaces of the strips by the action of rollers 161, 162, the threads 155 thereby being secured under the sides of the tapes as shown in FIGURE 7. The adhesive dries quickly, uniting the veneer strips into a continuous ribbon of veneer.

The continuous ribbon of veneer is carried to clipper 31 by conveyor belt 62 which is driven by shaft 60. Clipper 31 (FIGURE 1) is actuated by a timing device from the conveyor drive, by photoelectric circuits, or by similar means, to cut the continuous veneer ribbon into sheets of a predetermined standard length suitable for core veneers in sandwich assemblies with face sheets which are pressed to form the ultimate product. Conveyor 63 carries the assembled cores from the clipper.

When the panels are trimmed after the pressing operation, the taped ends of the strips are removed whereby the tapes and threads are not interposed in the glue line to weaken the bond between adjacent layers of veneer. It will be evident that the present taping process is applicable to veneers of any thickness and is not limited to relatively thick veneers as in the case of previous methods where the veneer strips have been united by marginal connecting means such as strings glued in end grooves.

What is claimed is:

1. A core veneer sheet comprising a plurality of veneer strips secured together in side by side relation by a pair of tapes extending across all of said strips, said tapes being folded over the ends of said strips at opposite ends of the sheet and adhesively secured to the top and bottom faces of said strips, said strips having a multiplicity of closely spaced incisions extending longitudinally of the strips on the opposite faces thereof.

2. In a machine for making core veneer sheets, means for supporting a plurality of veneer strips in side by side relationship, means for applying tapes along the ends of said strips and means for folding said tapes over and securing them to the opposite faces of said strips to hold the strips together and means for introducing reinforcing threads onto the portions of said tape to be secured to the opposite faces of said strips prior to said folding means.

3. The method of making a core veneer sheet comprising incising a plurality of veneer strips longitudinally of the grain thereof, maintaining the edges of the veneer strips substantially perpendicular to the direction of travel of the veneer strip, and taping the incised strips together in side by side relation by folding a pair of tapes over the opposite ends of the strips and securing said tapes to the strips.

4. The method of making a composite sheet from a plurality of veneer strips comprising incising the strips longitudinally, moving the incised strips edgewise in edge abutting relationship, maintaining the edges of the veneer strips substantially perpendicular to the direction of travel of the veneer strip, trimming the ends of the moving strips, folding a pair of tapes over the trimmed ends of the strips with the tapes extending in the direction of said movement, and securing the folded tapes to the opposite faces of the strips.

5. A machine for making core veneer sheets comprising means for incising veneer strips so that the strips longitudinally of the grain will lie flat, means for supporting a plurality of incised veneer strips in side by side relationship, and means for applying, folding and securing tapes over the ends and opposite faces of said strips to hold the strips together.

6. A machine for making core veneer sheets comprising an incisor adapted to incise veneer strips longitudinally of the grain, means for passing veneer strips through said incisor, means for crowding the incised veneer strips together laterally in edge abutting relationship, means for adjusting said incisor to vary the relative incision in opposite ends of said strips in order to maintain the side edges of the strips perpendicular to the direction of crowding, and means for folding and securing tapes over the ends of said strips and across the joints between said abutting edges to hold said strips together.

7. A machine for making core veneer sheets comprising an incisor adapted to incise veneer strips longitudinally of the grain, means for passing veneer strips through said incisor in edgewise movement, a crowding conveyor arranged to crowd the distended strips into edge abutting relationship, laterally adjustable trim saws on opposite sides of said conveyor arranged to cut the crowded strips to predetermined length according to the width of sheet desired, a conveyor arranged to hold the trimmed strips flat and continue said edgewise movement with the strips in edge abutting relationship, tape applying mechanisms on opposite sides of said last conveyor arranged to apply tapes to the trimmed ends of said strips, fold said tapes over the opposite faces of said strips and secure said tapes to said faces to connect the strips together, and means to adjust said tape applying mechanisms laterally of the conveyor in accordance with the lateral spacing of said trim saws.

8. A machine for making core veneer sheets comprising an incisor adapted to incise veneer strips longitudinally of the grain, a first conveyor section arranged to convey veneer strips from said incisor in edgewise movement, a taping section having a conveyor spaced from said first conveyor and running slightly slower than said first conveyor, a crowding conveyor between said first two conveyors arranged to receive veneer strips from said first conveyor and deliver them to said taping section conveyor in edgewise movement and to crowd said strips into edge abutting relationship, and mechanism in said taping section for connecting said strips together with tape along the ends thereof.

9. In a machine for making core veneer sheets having conveyor means for advancing edge abutting veneer strips in edgewise movement, a tape holder, a vertical flat roller arranged to present a tape from said holder on edge adjacent the ends of said strips, a vertical V-grooved roller arranged to fold a tape from said flat roller over the top and bottom surfaces of said strips, and top and bottom horizontal rollers arranged to press the folded tape against said top and bottom surfaces of said strips.

10. The structure defined in claim 9, including a pair of creasing rollers to form a longitudinal crease in the tape which will seek the bottom of the groove in said grooved roller and center the tape in said roller to facilitate folding the tape, said crease defining the fold line of the tape.

11. The structure defined in claim 9, including a moistener roller to moisten an adhesive coated tape.

12. The structure defined in claim 9, including thread holders and guides arranged to feed reinforcing threads to said tape on opposite sides of its fold.

13. The structure defined in claim 9, including spring arms mounted on said V-grooved roller and arranged to aid said roller in folding said tape over said strips.

14. The method of making a core veneer sheet comprising arranging a plurality of veneer strips in edge abutting relationship to form a sheet assemblage, maintaining the edges of the veneer strips substantially perpendicular to the direction of travel of the veneer strip, applying a pair of tapes along opposite ends of the sheet assemblage across the joint between said strips, interposing reinforcing threads between said tapes and said faces as said tapes are applied and adhesively secured to said strips, folding said tapes over opposite faces of said strips, and adhesively securing said tapes to said faces to hold said strips together in assembled relation.

15. The method of making a core veneer sheet comprising crowding a plurality of veneer strips together in edge abutting relation and moving the crowded strips in an edgewise direction, maintaining the edges of the veneer strips substantially perpendicular to the direction of travel of the veneer strips, applying a pair of tapes progressively to the opposite ends of the moving strips, interposing reinforcing threads longitudinally of the tapes between said tapes and said faces as said tapes are applied and secured to said strips, folding said tapes over the opposite faces of said strips, and securing said tapes to the strips one after another to hold the strips together.

16. A core veneer sheet comprising a plurality of veneer strips secured together in end abutting relationship by a pair of tapes extending along opposite ends of the sheet including reinforcing threads secured under said tapes to said faces of the strips, said tapes being folded over and secured to the opposite faces of said strips.

17. A core veneer sheet comprising a plurality of veneer strips disposed side by side, and a pair of tapes extending along opposite ends of said sheet across the joints between adjacent strips to hold said strips together in edge abutting relationship including reinforcing threads running longitudinally of said tapes adhesively secured between said side portions of said strips, each tape having a longitudinal fold providing two side portions overlying the opposite faces of said strips, said side portions being adhesively secured to the respective faces of said strips.

References Cited in the file of this patent

UNITED STATES PATENTS

| | | |
|---|---|---|
| 593,326 | Jumeau | Nov. 9, 1897 |
| 2,244,282 | Bergstein | June 3, 1941 |
| 2,657,160 | Croston | Oct. 27, 1953 |
| 2,682,909 | Claff | July 6, 1954 |
| 2,749,966 | Roetger | June 12, 1956 |

UNITED STATES PATENT OFFICE
CERTIFICATE OF CORRECTION

Patent No. 3,135,644

June 2, 1964

Lewis H. Coplen et al.

It is hereby certified that error appears in the above numbered patent requiring correction and that the said Letters Patent should read as corrected below.

Column 8, lines 33 to 35, strike out " A machine for making core veneer sheets comprising means for incising veneer strips so that the strips longitudinally of the grain will lie flat, means for sup-" and insert instead -- A machine for making core veneer sheets comprising means for incising veneer strips longitudinally of the grain so that the strips will line flat, means for sup- --.

Signed and sealed this 16th day of March 1965.

(SEAL)
Attest:

ERNEST W. SWIDER
Attesting Officer

EDWARD J. BRENNER
Commissioner of Patents